Patented Sept. 26, 1950

2,523,333

UNITED STATES PATENT OFFICE 2,523,333

BLEND OF MELAMINE-FORMALDEHYDE AND ANILINE - PHENOL - FORMALDEHYDE RESINS

Paul C. Schroy, Corpus Christi, Tex., Joseph Grabowski, Stamford, Conn., and Milton J. Scott, Springfield, Mass., assignors to American Cyanamid Company, New York, N. Y., a corporation of Maine No Drawing. Application February 20, 1945, Serial No. 578,954

4 Claims. (Cl. 260—45)

This invention relates to compositions suitable for molding and is more particularly concerned with the production of moldings possessing good electrical properties and dimensional stability.

In the use of plastics for electrical applications, it has been found that the various thermosetting resins are generally lacking in one or more respects and are unsuitable for many applications. For electrical purposes, the moldings are usually made with metal inserts and good dimensional stability of the molding is a prerequisite since undue after-shrinkage will cause cracking of the molding and loosening of the metal inserts thereby substantially detracting from the value of the molding. The phenolic molding compounds generally have satisfactory dimensional stability but are lacking in electrical properties such as arc resistance. The amino-plastics such as the urea and melamine resins have good electrical properties (i. e. arc resistance), but the molded articles made from such compositions tend to shrink and when metal inserts are used, may crack around these inserts.

It is one of the objects of this invention to prepare compositions suitable for making moldings having good dimensional stability.

It is a further object to prepare molded articles having good electrical properties, more especially good arc resistance and dielectric strength both at room and at elevated temperatures.

It is a still further object to prepare molding compositions which can be molded with metal inserts to produce molded articles which are resistant to shrinkage and cracking, even at elevated temperatures.

These and other objects are attained by preparing compositions from melamine resins modified with an aromatic amine-aldehyde resin and compounded with suitable fillers such as calcined (heat-treated) asbestos.

The melamine-formaldehyde resins have the outstanding property of being hardenable to the finally cured stage in the presence of the alkaline reacting asbestos. Thus the important field of asbestos molding compositions can be enlarged by the compositions containing melamine resins as a binder. However, it was found that in spite of the other valuable properties, moldings made from such compositions retain the disadvantage of the melamine component which is common to all amino-plastic compositions, namely, having a high shrinkage, especially at elevated temperature. We have found that by modifying the melamine resins with a rather small proportion of aniline resins this disadvantage is overcome.

The following examples in which parts are given by weight, are for purposes of illustrating the invention which is not limited to the details set forth. The zinc stearate used in the following examples may be omitted or replaced in whole or in part by other mold lubricants. The Formalin is 40% formaldehyde by volume, or 37.5% by weight.

EXAMPLE 1

196 parts of melamine-formaldehyde resin A (ratio 1:2 mols)
42 parts of aliline-shellac-formaldehyde resin C
42 parts of aniline-cresol-formaldehyde resin B
7 parts of zinc stearate
420 parts of #115 grade chrysotile asbestos The resins are separately prepared as fine-ground powders. The asbestos used has preferably been heated at around 1200° F. for about 30 minutes. The mixture of the several ingredients as listed is blended and compounded on hot differential rolls. After the desired degree of compounding is obtained, the relatively thin sheets coming off the rolls are cooled and broken up to pass a ⅛ inch screen. This product is suitable for a molding composition.

Molded articles are prepared in the customary manner by placing the desired amount of the molding composition in a suitable mold, with or without metal inserts, and it is subjected to a typical molding operation by heating at a temperature of 150–160° C. for 5–10 minutes under a pressure of about 3000 lbs./square inch.

A typical molded article prepared from the molding composition just described as compared with a similar article prepared from melamine-formaldehyde molding composition was found to have the following characteristics:

| | Arc Resistance ASTM sec. | Dielectric Strength (v./mil) | | Shrinkage (8 hrs. at 220° F.) mils/in. | Power Factor | Dielectric Constant |
|---|---|---|---|---|---|---|
| | | | | | 60 cycles | |
| | | 25° C. | 100° C. | | Percent | |
| Compound of Example 1 | 145 | 416 | 391 | 2.0 | 15.2 | 11.7 |
| Melamine-formaldehyde Compound | 190 | 412 | 303 | 5.5 | 23.0 | 17.0 |

*Preparation of melamine-formaldehyde resin A*

In a typical example of this resin, 63 parts of melamine and 85 parts of Formalin (40% by volume) are heated to reflux at a pH of 6.8 (brom-thymol-blue) obtained with sodium hydroxide. The resin syrup is then cooled to 75° C. and maintained at this temperature until it shows slight hydrophobicity on adding a few drops to ice water. At this hydrophobe point, the pH is adjusted to 8.3 (thymol blue). Following this, the syrup is concentrated at a vacuum of 20½ inches of mercury until the temperature reaches 115° C., whereupon the resin is withdrawn from the kettle to cool. The cooled resin is ground to a fine powder.

*Preparation of aniline-cresol-formaldehyde resin B*

In an example for the preparation of this resin, 78 parts of aniline and 30 parts of cresol are heated together to 100° C. and then cooled to room temperature. Following this, 90 parts of Formalin (40% by volume) are slowly added with cooling. After all the Formalin has been added, a catalyst composed of 0.57 part of concentrated sulfuric acid (95.5%) and 14 parts of water is added, and the whole reaction mixture refluxed for two hours. Following the reflux period, the product is vacuum-concentrated until a final temperature of 120° C. at a vacuum of 27 to 28 inches is reached. Thereupon the resin is withdrawn from the kettle, allowed to cool and ground to a fine powder.

The cresol used above is the conventional cresol used commercially and it is a mixture including all of the isomers of cresol sold as "Resin Cresol No. 8" by the Barrett Company and, according to the manufacturer, it contains approximately 5% of o-cresol, 45% of m-cresol, 30% of p-cresol, 3% of phenol and 17% of xylenols. A commercial mixture substantially free of o-cresol and containing substantially only m-cresol and p-cresol (equal proportions±10%) gives somewhat improved results.

*Preparation of aniline-shellac-formaldehyde resin C*

The method of preparation of this resin is similar to the aniline-cresol resin B, except that 30 parts of shellac are substituted for the cresol.

EXAMPLE 2

112 parts of melamine-formaldehyde resin A
48 parts of aniline-shellac-formaldehyde resin C
4 parts of zinc stearate
240 parts of asbestos (heat-treated)

This composition is mixed and blended on hot rolls as described in Example 1.

EXAMPLE 3

112 parts of melamine-formaldehyde resin A
48 parts of aniline-phenol-formaldehyde resin B
4 parts of zinc stearate
240 parts of asbestos (calcined)

This composition is mixed and blended on hot rolls as described in Example 1.

EXAMPLE 4

96 parts of melamine-formaldehyde resin A
16 parts of aniline-cresol-formaldehyde resin B
48 parts of aniline-shellac-formaldehyde resin C
4 parts of zinc stearate
240 parts of asbestos (calcined)

This composition is mixed and blended on hot rolls as described in Example 1.

Generally speaking, at least 30% of the resin content of these compositions should be of the melamine-aldehyde type. Of course, the melamine and formaldehyde or equivalent aldehyde may be combined in any suitable combining molar ratio from 1:2 to 1:6 or even as high as 1:20. If less than 30% of the melamine resin is used in the resin portion of our compositions, it is sometimes difficult to obtain proper cure. The degree of polymerization of the melamine resin may also be varied in accordance with the properties desired for the finished compositions.

In place of part or all of the melamine, there may be substituted other triazines such as phenyl melamines, also dicyandiamide or mixtures thereof. In some cases, thiourea or urea resins may be included in the compositions.

EXAMPLE 5

196 parts of dicyandiamide-formaldehyde resin D
42 parts of aniline-shellac-formaldehyde resin C
42 parts of aniline-cresol-formaldehyde resin B
7 parts of zinc stearate
420 parts of asbestos (heat-treated)

This composition is mixed and blended on hot rolls as described in Example 1.

*Preparation of dicyandiamide-formaldehyde resin D*

This resin may be prepared by mixing 91 parts of dicyandiamide with 175 parts Formalin (40% by volume) and adjusting to pH 8.6 (glass electrode) by addition of a solution of sodium hydroxide. The mixture is heated to reflux in ½ hour and is cooled to 65° C. in about 10 minutes when the solution is vacuum concentrated at 20½ inches of mercury until the temperature of the batch reaches 98° C. At this point the molten resin is withdrawn, cooled and the solid resin formed is ground to a fine powder.

EXAMPLE 6

In place of all or part of resin A in Example 1, there may be substituted a resin prepared as follows:

To 600 parts of Formalin (40% by volume) is added 266 parts of a mixture of phenyl melamines prepared by reacting aniline with dicyandiamide. The resulting mixture is heated to reflux in about ½ hour and the pH is set at 8.3 (glass electrode) by the addition of sodium hydroxide. The resulting syrup is vacuum concentrated at a temperature of 85° C. or higher. When the temperature reaches 95° C. at a vacuum of 41 cc. of mercury, the batch is withdrawn, allowed to cool and the solid resin is ground to a powder.

The dry amine resins and dry aminotriazine resins are preferably blended together with the filler, but we may also mix the separately prepared resin syrups, dehydrate the mixture and mix the resulting dry resin with the filler.

The aniline resins described may be replaced by other suitable resins such as those prepared from aniline and formaldehyde, aniline and furfuraldehyde, with or without other modifying ingredients. In order that these resins be most suitable for use in accordance with the present invention, they should be non-crystalline, dry, grindable compounds capable of softening during the blending operation on the hot rolls. In some cases the aniline resins are chilled before they are ground. In place of the aniline, other reactive aromatic amines such as toluidine may be used. Where modifying ingredients are used for the amine resin, the shellac can be replaced by rosin or the like or by synthetic lactides. Likewise, phenol or other substituted phenols may be used in place of part or all of the cresols, e. g. the xylenols. The amine resin or resins preferably form at least about 5% of the resinous portion of our compositions and may be present in an amount equivalent to about 70%. Approximately 30%-40% of the amine resins is most generally suitable. It has been found that the cure of the amine resin-aminotriazine resin mixture may be influenced by alkalies.

The fillers which are incorporated in the molding compositions may also be varied in that part or all of the asbestos may be replaced by wood meal, wood flour, cotton flock, alpha cellulose, mica, glass fibers, and other fibrous or mineral fillers or mixtures thereof. The use of cotton flock and asbestos in ratios between about 1:9 and 2:3 is especially desirable for obtaining a combination of heat resistance, electrical properties, and impact strength. Such a composition as that in Example 4 may be modified in this way by replacing 25% of the asbestos with cotton flock. The fillers may be in woven or otherwise fabricated form.

The molding compositions of the present invention are especially valuable for making molded parts for motor magnetos, distributors and other ignition parts to replace the more commonly used hard rubber which lacks heat resistance or the molded phenolic compositions which lack arc resistance. Terminal blocks which were previously made from various compositions with generally unsatisfactory results can now be hot molded with the instant compositions by the use of heat and pressure to give products having high dielectric properties and good dimensional stability.

As has been described, the electrical properties of articles prepared from the present compositions are excellent. The properties may be further enhanced by heating the molded parts, a procedure which may be referred to as stoving. Thus molded articles prepared as in Example 1 are seen to have a power factor of 15.2%. If these molded articles are stoved by heating between about 220° F. and 300° F. for 8-24 hours, power factors of about 4% to 6% are obtained. As has also been described, our compositions are especially valuable for being molded by the "compression mold" technique wherein the molding composition is placed in the mold and is there shaped under heat and pressure. Our compositions are also extremely valuable for "transfer" molding wherein the composition is separately heated in a suitable chamber or the like and is then forced under pressure into the mold which shapes the finished article. The compositions of the present invention are generally suitable for use in extrusion molding processes.

In some cases it may be desired to prepare transparent moldings in which event the fillers are omitted and, if necessary, the resins are subjected to a partial polymerization treatment prior to the actual molding.

Our resins can be spread on any carrier of inorganic or organic nature such as for instance on paper, asbestos paper, canvas, asbestos cloth, glass cloth, mixed cotton and glass cloth, etc., and either shaped into laminated base compositions such as plates or tubes or into moldings of relatively simple shape. Furthermore, pieces of these carriers covered with our resin compositions may be used alone as described and also may be used in conjunction with molding compositions on parts where added strength is required, such molding compositions being of a compatible nature.

This application is a continuation-in-part of our copending application Serial No. 421,484, filed December 3, 1941, and now Patent No. 2,388,293.

It will be obvious that other changes and variations may be made in carrying out the present invention without departing from the spirit and scope thereof as defined in the appended claims.

We claim:

1. The process of preparing a molding composition which can be heat and pressure molded to form a molded article having good dimensional stability and good electrical properties, which comprises blending a filler with a resin mixture consisting essentially of a separately prepared and relatively finely ground fusible melamine-formaldehyde resin and a separately prepared and relatively finely ground fusible aniline-phenol-formaldehyde resin containing substantial amounts of aniline and phenol, the melamine resin comprising about 95-30% of the total weight of said resins and the aniline resin correspondingly comprising about 5-70% of the total weight of said resins.

2. A molding composition which can be heat and pressure molded to form a molded article having good dimensional stability and good electrical properties which comprises a filler and a resin mixture consisting essentially of a separately prepared and relatively finely ground, fusible melamine-formaldehyde resin and a separately prepared and relatively finely ground, fusible aniline-phenol-formaldehyde resin containing substantial amounts of aniline and phenol, the melamine resin comprising about 95-30% of the total weight of said resins and the aniline resin correspondingly comprising about 5-70% of the total weight of said resins.

3. A heat and pressure molded article prepared by subjecting the composition of claim 2 to heat and pressure for sufficient time to produce a thermoset molded article.

4. A molded article for ignition system comprising a mixture of a melamine-formaldehyde resin and an aniline-phenol-formaldehyde resin, the melamine resin comprising 95–30% of the total weight of said resins and the aniline-phenol resin comprising 5–70% of the total weight of said resins.

PAUL C. SCHROY.
JOSEPH GRABOWSKI.
MILTON J. SCOTT.

REFERENCES CITED

The following references are of record in the file of this patent:

UNITED STATES PATENTS

| Number | Name | Date |
|---|---|---|
| 1,873,799 | Vacher | Aug. 23, 1932 |
| 1,955,731 | Bender | Apr. 24, 1934 |
| 1,994,753 | Cherry | Mar. 19, 1935 |
| 2,197,357 | Widmer et al. | Apr. 16, 1940 |
| 2,262,728 | Swain et al. | Nov. 11, 1941 |
| 2,325,375 | D'Alelio | July 27, 1943 |
| 2,368,451 | D'Alelio | Jan. 30, 1945 |
| 2,388,293 | Schroy et al. | Nov. 6, 1945 |

FOREIGN PATENTS

| Number | Country | Date |
|---|---|---|
| 118,408 | Australia | Apr. 17, 1944 |
| 557,558 | Great Britain | Nov. 25, 1943 |